United States Patent [19]

Park

[11] Patent Number: 5,797,349

[45] Date of Patent: Aug. 25, 1998

[54] FILTER TOP CHANGE STATION FOR AN ANIMAL CAGE

[75] Inventor: Chin Soo Park, Salisbury, Md.

[73] Assignee: Lab Products, Inc., Seaford, Del.

[21] Appl. No.: 742,992

[22] Filed: Nov. 1, 1996

[51] Int. Cl.[6] ................................................ A01K 1/035
[52] U.S. Cl. .................................... 119/419; 119/418
[58] Field of Search ................................ 119/419, 418, 119/417

[56] References Cited

U.S. PATENT DOCUMENTS 5,347,554  9/1994  White et al. ............................ 376/260
5,379,330  1/1995  Lovell et al. ........................... 376/260
5,379,506  1/1995  Park ..................................... 29/426.6

Primary Examiner—Edgar S. Burr
Assistant Examiner—Daniel J. Colilla
Attorney, Agent, or Firm—Stroock & Stroock & Lavan LLP

[57] ABSTRACT

A filter change station is provided having a base board. A first guide support and a second guide support are mounted on the base board in facing relationship. A separator is mounted on at least the first guide support along a slide path of a cage top for separating a filter retainer from the cage top as the cage top moves along the guide support within the slide path.

6 Claims, 1 Drawing Sheet

U.S. Patent  Aug. 25, 1998  5,797,349
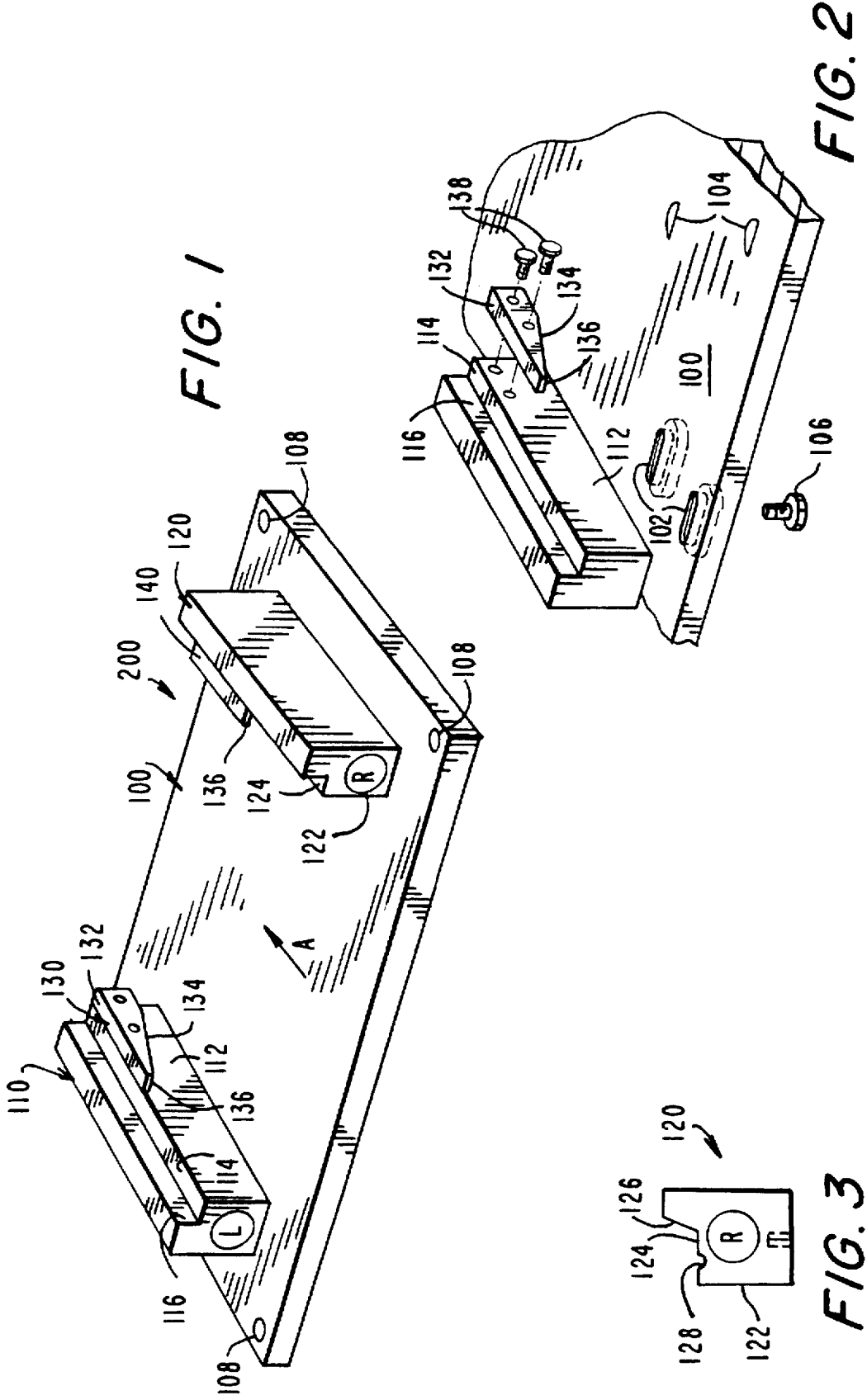

FILTER TOP CHANGE STATION FOR AN ANIMAL CAGE

BACKGROUND OF THE INVENTION

This application is directed to a filter top change station, and in particular, a station for facilitating removal of a filter top from a cage bonnet for an animal cage.

It is known in the art from U.S. Pat. No. 4,480,587 assigned to Lab Products Inc. to affix a filter top to an animal cage assembly. The filter top includes a bonnet (cage top) a filter and a filter retainer to maintain the filter to the cage top. The filter top allows for the filtered exchange of air between the animal within the cage and the outside environment. However, over time, the filter becomes dirty and must be replaced. The filter retainer is fastened to the filter top by screws, or in the case of U.S. Pat. No. 4,640,228, also assigned to Lab Products Inc., by a retaining ring. To remove the filter top requires either special tools or a complicated process of steps.

It is also known in the prior art from my co-pending U.S. patent application for Ventilated Cage and Rack System filed Sep. 18, 1996, to utilize a filter retaining structure which does not require tools, securing lock nuts or the like. A substantially rigid filter retainer is sized to fit upon the bonnet of the cage and substantially cover the perforated top of the bonnet. The filter retainer has a top and perforations substantially coextensive with the perforations on the top of the bonnet. The filter retainer also has side walls extending from the top end of the retainer forming an open bottom end. Detents are formed on at least one side wall of the bonnet and at least one slot is formed in at least one side wall of the filter retainer so as to receive the detent therein when the filter retainer is mounted on the bonnet. As a result, all that is required to detach the retainer is a flexing of the retainer relative to the bonnet. This structure has been satisfactory, however, constant and numerous repetitions of this flexing action will fatigue the hands of the technician and may lead to carpal tunnel syndrome or the like. Accordingly, it is desired to provide a system for removing the retainer assembly which overcomes the shortcomings of the prior art while providing a quick simple easily repeated manner for removing the retainer.

SUMMARY OF THE INVENTION

Generally speaking, in accordance with the invention, a filter top change station which facilitates separating the filter top retainer from the cage bonnet is provided. The station includes a base board. A left guide support and a right guide support are mounted in facing relationship on the base board across a gap corresponding to the width of a cage bonnet. A separator is mounted along a slide path for the bonnet as it moves along the guide support, the separator being disposed in a position to separate the filter retainer from the bonnet.

In an exemplary embodiment, the guide supports are slidably mounted to the base board so that they can be positioned to adjust the gap between the slidable guides as required.

Accordingly, it is an object of the invention to provide a filter top change station which simplifies the filter retainer removing process.

Another object of the invention is to provide a filter top change station which reduces the stress on the muscles of the person changing the filter top.

Yet another object of the invention is to speed up the filter changing process.

Still other objects and advantages of the invention will in part be obvious and will in part be apparent from the specifications and drawings.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of a filter top change station for an animal cage constructed in accordance with the invention;

FIG. 2 is a partial exploded view of a filter top change station constructed in accordance with the invention; and FIG. 3 is a side elevational view of a right guide support member constructed in accordance with the invention, the left guide support member being a mirror image thereof.

DETAILED DESCRIPTION OF THE PREFERRED EMBODIMENTS

Reference is made to FIGS. 1–3, wherein a filter top change station generally indicated as 200, constructed in accordance with the invention is shown. Filter top change station 200 includes a base board 100, and a first guide support 110 and a second guide support 120 mounted thereon in facing relationship. A respective separator 130, 140 is mounted on an inner surface of a respective guide support 110, 120.

Base board 100 is formed with left slots 102 and right slots 104. Screws 106 (of which one is shown) extend through a respective one of slots 102, 104 and affix guide support 110 and guide support 120 to base board 100. Slots 102 and slots 104 extend for a length along the width of base board 100 to allow screw 106 to slide within slots 102, 104 to adjust the position of guide supports 110, 120 relative to each other. In a preferred embodiment, each of slots 102, 104 has a length of ⅛ of an inch allowing each guide support 110 and guide support 120 to be moved towards the other or away from the other by ⅛ of an inch to accommodate a variety of filter tops. Mounting holes 108 may be formed within base board 100 to mount base board 100 at a desired location of a work bench, table or the like. In a preferred embodiment, base board 100 is formed of BAKELITE plastic material.

Guide support 110 is substantially L-shaped when viewed on end and has a side wall 112. A slide surface 114 is formed at the top of side wall 112. An inner guide surface 116 extends substantially orthogonally from slide surface 114 to provide a corner along the length of guide support 110. Similarly, guide support 120 has a side wall 122, a slide surface 124 and an inner guide surface 126 (FIG. 3). FIG. 3 shows an exemplary embodiment of guide support 120 in which a groove 128 is formed along the length of slide surface 124 to receive a rib formed on the cage bonnet.

A separator 130 includes a top 132 and a tapered surface 134 extending towards top 132 to form a substantially triangular front end 136 of separator 130. Separator 130 is affixed to side wall 112 by screws 138 at a position in which top 132 is substantially coplanar with slide surface 114. Separator 140 is affixed in a similar manner. Guide supports 110, 120 define a slide path for a cage top from which a filter retainer is to be separated. Guide supports 110, 120 are positioned so as to define a distance therebetween substantially equal to the width of the filter retainer. In a preferred embodiment, support guides 110, 120 are made of plastic while separators 130, 140 are made of machined aluminum.

During operation, a filter cage top is placed on guide support 110 and guide support 120 in an inverted position so that the filter top retainer is in facing relationship with base board 100. The skirt of the cage top rests on slide surfaces 114, 124. The cage top is slid along slide surfaces 114, 124 in the direction of arrow A towards the separating edge 136 of separators 130, 140. Because the skirt slides along slide surface 114, 124 and because separators 130, 140 are substantially coplanar with slide surface 114, 124 separator edge 136 is substantially disposed at the position where the filter retainer meets the cage top, acting as a wedge to separate the filter retainer from the cage top as the cage top is slid along the cage top slide path in the direction of arrow A. Once a complete pass has been made by the cage top, the filter retainer will fall to the surface of base board 100 allowing for easy removal of the filter which had been previously retained between the filter retainer and cage top.

The corner formed by inner guide surface 116 and slide surface 114 as well as the corner formed by inner surface 126 and slide surface 124 maintains the skirt in position as the cage top moves along the cage top slide path, guiding the filter top towards the separator 130, 140 while maintaining the relative position of all of the elements.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A filter top change station for animal cages comprising:
   a base board;
   a first guide support;
   a second guide support separated from said first guide support to define a cage top slide path; and
   a first separator mounted on said first guide support along said cage slide path for separating a filter retainer from a cage top when said cage top is moved along said first guide support and second guide support along said cage top slide path.

2. The filter top change station of claim 1, further comprising a second separator mounted on said second guide support.

3. The filter top change station of claim 1, wherein at least said first guide support is movably mounted to said base board to allow said at least first guide support to be moved towards and away from said second guide support to adjust the width of said cage top slide path.

4. The filter top cage support of claim 1, wherein said first and second guide supports include a slide surface for supporting said cage top as said cage top moves along said cage top slide path.

5. The filter top cage station of claim 4, wherein said first separator is mounted on said first guide support coplanar with said slide surface.

6. The filter top change station of claim 1, wherein said first guide support and second guide support are each formed with a groove therein.

\* \* \* \* \*